United States Patent
Yamada

(10) Patent No.: US 8,536,810 B2
(45) Date of Patent: Sep. 17, 2013

(54) CONTROL DEVICE AND CONTROL METHOD FOR ALTERNATING-CURRENT MOTOR

(75) Inventor: Kenji Yamada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 407 days.

(21) Appl. No.: 13/055,610

(22) PCT Filed: Jul. 8, 2009

(86) PCT No.: PCT/JP2009/062418
§ 371 (c)(1),
(2), (4) Date: Jan. 24, 2011

(87) PCT Pub. No.: WO2010/016352
PCT Pub. Date: Feb. 11, 2010

(65) Prior Publication Data
US 2011/0115420 A1    May 19, 2011

(30) Foreign Application Priority Data
Aug. 8, 2008 (JP) .................... 2008-205855

(51) Int. Cl.
H02P 6/08    (2006.01)
(52) U.S. Cl.
USPC .............. 318/400.09; 318/400.17; 318/400.2
(58) Field of Classification Search
USPC ................ 318/376, 400.01, 400.09, 400.17, 318/400.2, 599, 700, 811
See application file for complete search history.

(56) References Cited

U.S. PATENT DOCUMENTS

| 5,657,216 | A  | * | 8/1997 | Kaura ............................. 363/41 |
| 5,736,825 | A  | * | 4/1998 | Kaura et al. .................. 318/599 |
| 7,898,208 | B2 | * | 3/2011 | Ochiai et al. .................. 318/760 |
| 7,960,930 | B2 | * | 6/2011 | Sato .............................. 318/432 |
| 8,269,439 | B2 | * | 9/2012 | Itoh .......................... 318/400.09 |

FOREIGN PATENT DOCUMENTS

| JP | 2008-011682 A | 1/2008 |
| JP | 2008-017660 A | 1/2008 |
| JP | 4205157 B1    | 10/2008 |

* cited by examiner

Primary Examiner — Bentsu Ro
(74) Attorney, Agent, or Firm — Kenyon & Kenyon LLP

(57) ABSTRACT

When performing PWM control in accordance with an overmodulation mode, an ECU variably sets a switching determination value, which is used for determination of switching control modes between the overmodulation mode and a sinusoidal wave modulation mode, based on a switching state of an inverter at present. Then, the ECU compares the degree of modulation, which is calculated from voltage command values, with the switching determination value so as to determine whether to switch to the sinusoidal wave modulation mode or to maintain the overmodulation mode. In particular, when an influence of a dead time is likely to cause generation of a voltage command that requires switching to the overmodulation mode just after switching to the sinusoidal wave modulation mode, the switching determination value is variably set to prevent the transition from the overmodulation mode to the sinusoidal wave modulation mode. This prevents chattering in which the control modes are frequently switched therebetween.

20 Claims, 6 Drawing Sheets

FIG.2

| CONTROL METHOD | SINUSOIDAL WAVE PWM | OVERMODULATION PWM | RECTANGULAR WAVE (ONE PULSE) |
|---|---|---|---|
| | PWM CONTROL MODE | | RECTANGULAR WAVE VOLTAGE CONTROL MODE |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | 0~ABOUT 0.61 | MAXIMAL VALUE IN SINUSOIDAL WAVE PWM TO 0.78 | 0.78 |
| FEATURE | REDUCED FLUCTUATION OF TORQUE | IMPROVED OUTPUT IN MIDDLE SPEED REGION | IMPROVED OUTPUT IN HIGH SPEED REGION |

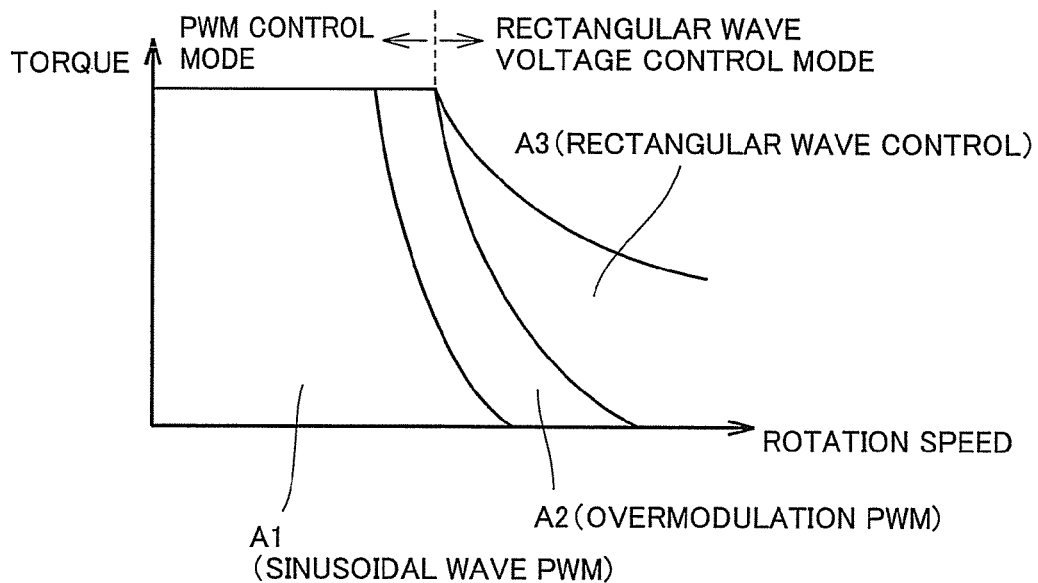

FIG.3

CONTROL DEVICE AND CONTROL METHOD FOR ALTERNATING-CURRENT MOTOR

This is a 371 national phase application of PCT/JP2009/062418 filed 8 Jul. 2009, claiming priority to Japanese Patent Application No. 2008-205855 filed 8 Aug. 2008, the contents of which are incorporated herein by reference.

TECHNICAL FIELD

The present invention relates to a control device and a control method for an alternating-current motor, more particularly, to control for the alternating-current motor, in which pulse width modulation (PWM) control having a sinusoidal wave modulation mode and an overmodulation mode is applied.

BACKGROUND ART

A driving method using an inverter has been employed to control driving of an alternating-current motor using a direct-current power source. The inverter is controlled for switching by an inverter driving circuit. For example, the alternating-current motor is fed with a voltage switched in accordance with PWM control.

Further, Japanese Patent Laying-Open No. 2008-11682 (Patent Document 1) discloses a PWM control configuration for control of driving of such an alternating-current motor. In current feedback control for compensating a deviation of a d deviation axis current and a deviation of a q axis current, the PWM control configuration selectively applies sinusoidal wave PWM control (FIG. 2 of Patent Document 1) and overmodulation PWM control (FIG. 3 of Patent Document 1). In the sinusoidal wave PWM control, the amplitude of a voltage command is not more than the amplitude of a reference triangular wave, whereas in the overmodulation PWM control, the amplitude of the voltage command exceeds the peak value of the reference triangular wave.

In particular, in Patent Document 1, for the control for the alternating-current motor, rectangular wave control is further applied. In the rectangular wave control, the alternating-current motor is fed with a rectangular wave voltage having a voltage phase controlled in accordance with a torque deviation. Also described therein is an art for stabilizing the switching of control modes between the rectangular wave control and the overmodulation PWM control.

PRIOR ART DOCUMENTS

Patent Documents

Patent Document 1: Japanese Patent Laying-Open No. 2008-11682

SUMMARY OF THE INVENTION

Problems to be Solved by the Invention

In the PWM control of Patent Document 1, the switching between the sinusoidal wave PWM control and the overmodulation PWM control is determined based on a comparison between the amplitude of a voltage required by the alternating-current motor and a threshold voltage. Patent Document 1 describes that this threshold representatively corresponds to the absolute value of a peak value of a reference triangular wave voltage, and it is appreciated that the threshold is a fixed value.

However, as understood from FIG. 3 of Patent Document 1, in the overmodulation PWM control, the switching rate in the inverter is reduced to increase a fundamental wave component in a voltage applied to the alternating-current motor. Further, the normal sinusoidal wave PWM control is performed in a manner of so-called "asynchronous PWM", in which a carrier frequency is fixed to a high frequency. On the other hand, in the overmodulation PWM control, so-called "synchronous PWM" may be applied to prevent the positive value and the negative value of the voltage applied to the alternating-current motor from differing in absolute value in response to the reduced switching rate, thereby variably controlling the carrier frequency in accordance with the rotation speed of the alternating-current motor.

Further, in the control for switching in the inverter, in order to prevent a short-circuit current between upper/lower arm elements of the same phase, a dead time, in which both the upper/lower arms of the phase are turned off, has to be provided for practical reasons when switching the switching elements to be on/off. If this dead time causes a great change in the switching rate in the inverter when switching the control modes, an influence of the dead time over an output voltage of the inverter, i.e., over the voltage applied to the alternating-current motor may be greatly changed.

When such a phenomenon takes place, the switching of control modes triggers a great change in voltage applied to the alternating-current motor, even if the voltage command is the same. The change may cause one control mode just switched from the other control mode to be switched back to the other control mode again, resulting in chattering in which the control Modes are frequently switched for a short period of time between the overmodulation PWM control and the sinusoidal wave PWM control. As such, the control can be unstable.

The present invention is made to solve such a problem, and has its object to prevent occurrence of chattering, i.e., frequent and repeated switching of control modes in PWM control for an alternating-current motor, in which overmodulation PWM control (overmodulation mode) and sinusoidal wave PWM control (sinusoidal wave modulation mode) are selectively applied.

Means For Solving The Problems

A control device according to the present invention is a control device for an alternating-current motor, in which an applied voltage is controlled by an inverter, and includes a pulse width modulation control unit, a mode-switching determining unit, and a determination value setting unit. The pulse width modulation control unit is configured to generate a control command for the inverter by performing pulse width modulation control based on a comparison between a voltage command signal of sinusoidal wave for operating the alternating-current motor in accordance with an operation command and a carrier wave signal. The mode-switching determining unit is configured to indicate which one of an overmodulation mode and a sinusoidal wave modulation mode is used for the pulse width modulation control performed by the pulse width modulation control unit. In the overmodulation mode, the voltage command signal has an amplitude larger than an amplitude of the carrier wave signal, whereas in the sinusoidal wave modulation mode, the voltage command signal has an amplitude equal to or smaller than the amplitude of the carrier wave signal. The determination value setting unit is configured to variably set a switching determination value for determining switching from the overmodulation mode to the sinusoidal wave modulation mode, based on a state of a power conversion operation performed by the inverter, when the pulse width modulation control is performed in accordance with the overmodulation mode. Further, the mode-switching determining unit determines whether to switch from the overmodulation mode to the sinusoidal wave modulation mode, based on a comparison between a value concerned with the voltage command signal and the switching determination value.

A control method according to the present invention is a control method for an alternating-current motor, in which an applied voltage is controlled by an inverter. The control method includes the steps of: controlling the inverter by performing pulse width modulation control based on a comparison between a voltage command signal of sinusoidal wave for operating the alternating-current motor in accordance with an operation command and a carrier wave signal; and selecting which one of an overmodulation mode and a sinusoidal wave modulation mode is applied to the pulse width modulation control, in the overmodulation mode, the voltage command signal having an amplitude larger than an amplitude of the carrier wave signal, in the sinusoidal wave modulation mode, the voltage command signal having an amplitude equal to or smaller than the amplitude of the carrier wave signal. The step of selecting including the steps of: variably setting a switching determination value for determining switching from the overmodulation mode to the sinusoidal wave modulation mode, based on a state of a power conversion operation performed by the inverter, when the pulse width modulation control is performed in accordance with the overmodulation mode, and determining whether to switch from the overmodulation mode to the sinusoidal wave modulation mode, based on a comparison between the switching determination value and a value concerned with the voltage command signal.

According to the control device and control method for an alternating-current motor, the switching determination value for switching from the overmodulation mode to the sinusoidal wave modulation mode can be set variably in accordance with the operation state of the power conversion in the inverter when performing the control in accordance with the overmodulation mode. In this way, the switching determination value can be appropriately set to reflect whether or not the power conversion operation state is such that the switching of the control modes to the sinusoidal wave modulation mode is likely to cause switching back to the overmodulation mode. This prevents a hunting phenomenon, in which the controls modes are frequently switched between the overmodulation mode and the sinusoidal wave modulation mode, thereby achieving stable PWM control.

Preferably, the inverter includes a power semiconductor switching element turned on/off according to a control command that follows the pulse width modulation control, and a frequency of the carrier wave signal is controlled in accordance with rotation speed of the alternating-current motor such that in the overmodulation mode, the frequency of the carrier wave signal is an integral multiple of a rotational frequency of the alternating-current motor. The determination value setting unit or the step of setting variably sets the switching determination value in accordance with the number of times of on/off of the power semiconductor switching element in a certain period in the overmodulation mode. More preferably, in the sinusoidal wave modulation mode, the frequency of the carrier wave signal is controlled in accordance with operating states of the inverter and the alternating-current motor, irrespective of the rotation speed of the alternating-current motor. The determination value setting unit or the step of setting variably sets the switching determination value based on a difference between a present value of the number of times of on/off of the power semiconductor switching element in the certain period in the overmodulation mode and an estimated value thereof upon transition to the sinusoidal wave modulation mode.

In this way, the switching determination value can be set variably in accordance with the switching rate in the inverter in the overmodulation mode in which the asynchronous PWM control is applied. Accordingly, the switching determination value can be set appropriately to reflect a degree of change in switching rate resulting from the switching of the control modes from the overmodulation mode.

Also, preferably, a frequency of the carrier wave signal is controlled in accordance with rotation speed of the alternating-current motor such that in the overmodulation mode, the frequency of the carrier wave signal is an integral multiple of a rotational frequency of the alternating-current motor. The determination value setting unit or the step of setting variably sets the switching determination value in accordance with the frequency of the carrier wave signal in the overmodulation mode. More preferably, in the sinusoidal wave modulation mode, the frequency of the carrier wave signal is controlled in accordance with operating states of the inverter and the alternating-current motor, irrespective of the rotation speed of the alternating-current motor. The determination value setting unit or the step of setting variably sets the switching determination value based on a difference between a present value of the frequency of the carrier wave signal in the overmodulation mode and an estimated value thereof upon transition to the sinusoidal wave modulation mode.

In this way, in accordance with the carrier frequency during the overmodulation mode in which the asynchronous PWM control is applied, the switching determination value can be set variably. With such a simple configuration, the switching determination value can be set appropriately to reflect a degree of change in switching rate resulting from the switching of the control modes from the overmodulation mode.

Alternatively, preferably, the determination value setting unit or the step of setting variably sets the switching determination value in accordance with a power factor for an alternating-current power in the overmodulation mode, the alternating-current power being transmitted between the inverter and the alternating-current motor in accordance with a control command that follows the pulse width modulation control. More preferably, the determination value setting unit or the step of setting variably sets the switching determination value based on a difference between a present value of the power factor for the alternating-current power in the overmodulation mode and an estimated value thereof upon transition to the sinusoidal wave modulation mode.

In this way, the switching determination value can be set appropriately to reflect the phenomenon that the influence of the dead time over the applied voltage to the alternating-current motor is changed by the phases of the voltage and the current of the alternating-current motor.

More preferably, the determination value setting unit or the step of setting sets the switching determination value by correcting a predetermined reference value with a correction value, which is variably set based on the state of the power conversion operation, and the correction value is set only for a polarity preventing transition from the overmodulation mode to the sinusoidal wave modulation mode.

In this way, the switching determination value can be variably set in such a manner that the reference value corresponding to the theoretical switching determination value is corrected only to prevent the switching from the overmodulation mode to the sinusoidal wave modulation mode. Accordingly, the switching determination value is corrected from the theoretical value only in the state effective for prevention of hunting, thereby achieving improved stability for the control.

Preferably, the value concerned with the voltage command signal and the switching determination value are indicated by a modulation ratio determined by a direct-current voltage input to the inverter and a voltage command value based on which the voltage command signal is generated. More preferably, the input direct-current voltage is generated by a converter for variably controlling an output voltage of a direct-current power source.

In this way, the determination of switching between the overmodulation mode and the sinusoidal wave modulation mode in the PWM control can be appropriately performed so as to correspond to the fluctuation of the direct-current link voltage in the inverter or the variable voltage control performed by the converter.

Effects of the Invention

According to the present invention, chattering, i.e., frequent and repeated switching of control modes, is prevented in PWM control for an alternating-current motor, in which the overmodulation mode and the sinusoidal wave modulation mode is selectively applied. Stable control is achieved.

BRIEF DESCRIPTION OF THE DRAWINGS

FIG. 2 schematically illustrates control modes for the alternating-current motor in the motor driving system according to the embodiment of the present invention.

FIG. 3 illustrates a correspondence relation between operating states of the alternating-current motor and the control modes shown in FIG. 2.

MODES FOR CARRYING OUT THE INVENTION

Figure 1:
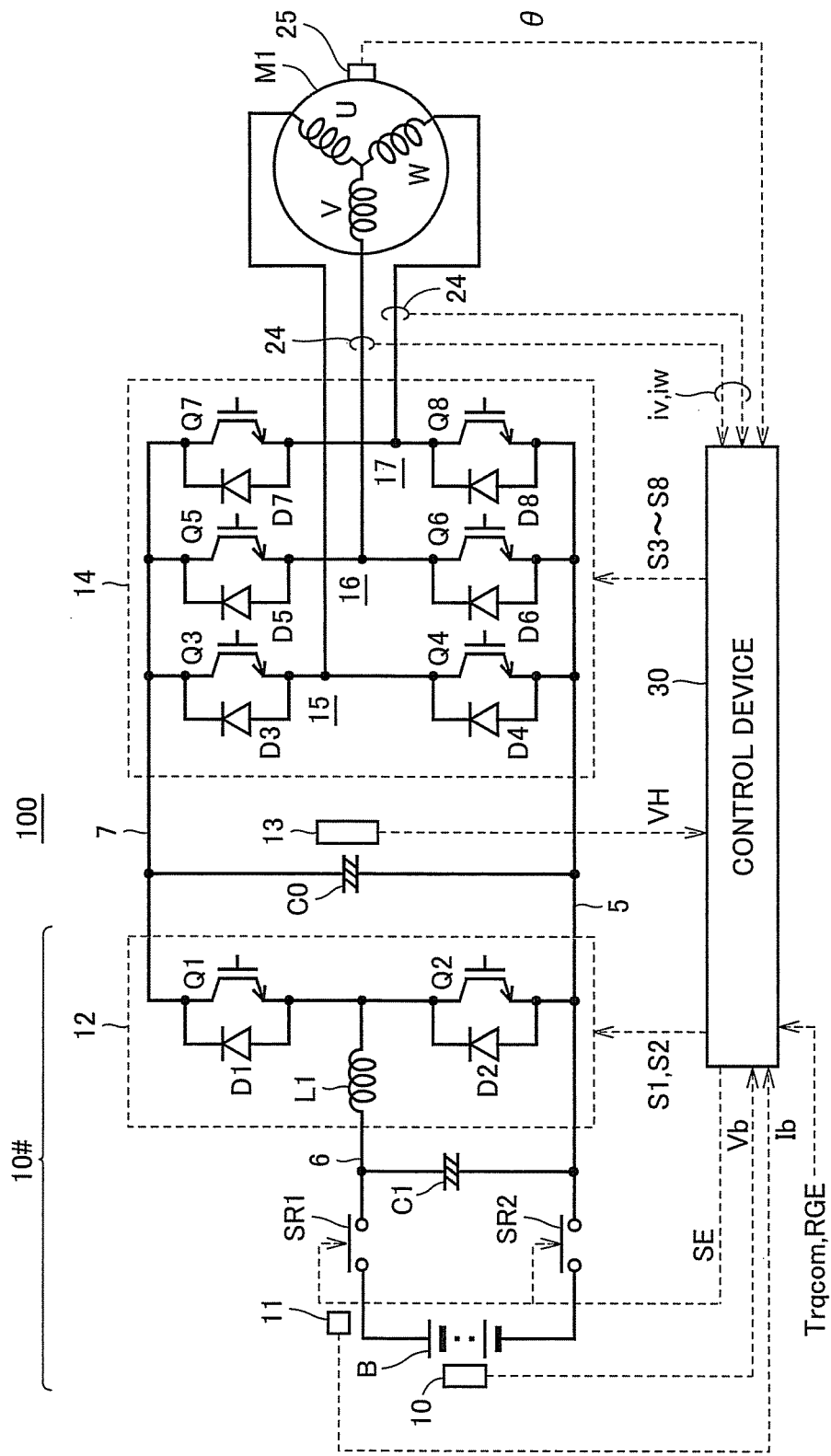
FIG. 1 is a diagram of an entire configuration of a motor driving control system to which a control device and a control method for an alternating-current motor according to an embodiment of the present invention is applied.

The following describes an embodiment of the present invention in detail with reference to figures. It should be noted that the same or corresponding portions in the figures are given the same reference characters and are not described repeatedly in principle.

Entire System Configuration

FIG. 1 shows an entire configuration of a motor driving control system to which a control device and a control method for an alternating-current motor in accordance with an embodiment of the present invention are applied.

Referring to FIG. 1, motor driving control system 100 includes a direct-current voltage generating unit 10#, a smoothing capacitor C0, an inverter 14, and an alternating-current motor M1.

Alternating-current motor M1 is, for example, a traction motor for generating torque to drive a driving wheel of a hybrid vehicle or an electric vehicle. Alternatively, alternating-current motor M1 may be configured to have a function of a power generator driven by an engine, and may be configured to have functions of both a motor and a power generator. Further, alternating-current motor M1 may operate as a motor for the engine and may be incorporated in a hybrid vehicle as a component capable of starting the engine, for example. In other words, the alternating-current motor in the present embodiment includes an alternating-current driven motor, a power generator, and a motor generator.

Direct-current voltage generating unit 10# includes a direct-current power source B, system relays SR1, SR2, a smoothing capacitor C1, and a step-up/step-down converter 12.

Direct-current power source B is constituted by a nickel hydrogen or lithium ion secondary battery, or a power storage device such as an electric double layer capacitor, representatively. Direct-current power source B outputs a direct-current voltage Vb and receives and sends a direct-current Ib, which are detected by a voltage sensor 10 and a current sensor 11 respectively.

System relay SR1 is connected between the positive electrode terminal of direct-current power source B and a power line 6, whereas system relay SR2 is connected between the negative electrode terminal of direct-current power source B and an earth line 5. Each of system relays SR1, SR2 is turned on/off in response to a signal SE from control device 30.

Step-up/step-down converter 12 includes a reactor L1, power semiconductor switching elements Q1, Q2, and diodes D1, D2. Power semiconductor switching elements Q1 and Q2 are connected between a power line 7 and earth line 5 in series. Turning on/off power semiconductor switching elements Q1 and Q2 is controlled by means of switching control signals S1 and S2 supplied from control device 30.

In the embodiment of the present invention, an IGBT (Insulated Gate Bipolar Transistor), a power MOS (Metal Oxide Semiconductor) transistor, a power bipolar transistor, or the like can be used as each of the power semiconductor switching elements (hereinafter, each simply referred to as "switching element"). Anti-parallel diodes D1, D2 are provided for switching elements Q1, Q2 respectively. Reactor L1 is connected between a connection node of switching elements Q1, Q2 and power line 6. Further, smoothing capacitor C0 is connected between power line 7 and earth line 5.

Inverter 14 includes U-phase upper/lower arms 15, V-phase upper/lower arms 16, and W-phase upper/lower arms 17, which are provided in parallel between power line 7 and earth line 5. Each of the upper/lower phase arms includes switching elements connected between power line 7 and earth line 5 in series. For example, U-phase upper/lower arms 15 include switching elements Q3, Q4 respectively. V-phase upper/lower arms 16 include switching elements Q5, Q6 respectively. W-phase upper/lower arms 17 include switching elements Q7, Q8 respectively. Further, anti-parallel diodes D3-D8 are connected to switching elements Q3-Q8 respectively. Turning on/off switching elements Q3-Q8 is controlled by means of switching control signals S3-S8 supplied from control device 30.

Typically, alternating-current motor M1 is a three-phase permanent magnet synchronous motor, and is configured to have three coils of the U, V, W phases, each having one end connected to a neutral point commonly. Each of the phase coils has the other end connected to the intermediate point of the switching elements of each of upper/lower phase arms 15-17.

In a step-up operation, step-up/step-down converter 12 steps up a direct-current voltage Vb supplied from direct-current power source B to obtain a direct-current voltage VH, which corresponds to a voltage input to inverter 14 and is hereinafter also referred to as "system voltage", and supplies it to inverter 14. More specifically, in response to switching control signals S1, S2 from control device 30, a period during which switching element Q1 is on and a period during which switching element Q2 is on (or a period during which both switching elements Q1, Q2 are off) are provided to come alternately. A step-up ratio is in accordance with the ratio of these on periods.

On the other hand, in a step-down operation, step-up/step-down converter 12 steps down direct-current voltage VH (system voltage) supplied from inverter 14 via smoothing capacitor C0 to charge direct-current power source B. More specifically, in response to switching control signals S1, S2 from control device 30, a period during which only switching element Q1 is on, and a period during which both switching elements Q1, Q2 are off (or on period of switching element Q2) are provided to come alternately. A step-down ratio is in accordance with the duty ratio of the foregoing on period.

Smoothing capacitor C0 smoothes the direct-current voltage supplied from step-up/step-down converter 12, and supplies the smoothed direct-current voltage to inverter 14. A voltage sensor 13 detects the voltage across smoothing capacitor C0, i.e., system voltage VH, and sends the detected value thereof to control device 30.

When the torque command value of alternating-current motor M1 is positive (Trqcom>0) and a direct-current voltage is supplied from smoothing capacitor C0, inverter 14 converts the direct-current voltage into an alternating-current voltage by means of switching operations of switching elements Q3-Q8 responding to switching control signals S3-S8 from control device 30, so as to drive alternating-current motor M1 to output a positive torque. Meanwhile, when the torque command value for alternating-current motor M1 has a value of 0 (Trqcom=0), inverter 14 converts the direct-current voltage into an alternating-current voltage by means of switching operations responding to S3-S8 and drives alternating-current motor M1 to obtain a torque of 0. By controlling in this way, alternating-current motor M1 is driven to generate a torque of 0 or of a positive value as designated by torque command value Trqcom.

Furthermore, upon regenerative braking of a hybrid vehicle or electric vehicle having motor driving control system 100 mounted thereon, torque command value Trqcom of alternating-current motor M1 is set to a negative value (Trqcom<0). In this case, by means of switching operations responding to switching signals S3-S8, inverter 14 converts an alternating-current voltage generated by alternating-current motor M1 into a direct-current voltage, and supplies the converted direct-current voltage (system voltage) to step-up/step-down converter 12 via smoothing capacitor C0. It should be noted that the term "regenerative braking" as described herein includes: braking involving regenerative power generation resulting from manipulation of the foot brake pedal by a driver who drives the hybrid vehicle or electric vehicle; and vehicular speed reduction (or stop of acceleration) involving regenerative power generation achieved by easing off the accelerator pedal during traveling without manipulating the foot brake pedal.

Current sensors 24 detect a motor current MCRT flowing in alternating-current motor M1, and notify control device 30 of the detected motor currents. The sum of the instantaneous values of three phase currents iu, iv, iw is zero. Hence, it is sufficient to dispose current sensors 24 to detect motor currents for two phases (for example, V-phase current iv and W-phase current iw) as shown in FIG. 1.

A rotational angle sensor (resolver) 25 detects a rotor rotational angle $\theta$ of alternating-current motor M1, and notifies control device 30 of rotational angle $\theta$ thus detected. Control device 30 can calculate the rotation rate (rotation speed) and angular velocity $\omega$ (rad/s) of alternating-current motor M1 based on rotational angle $\theta$. It should be noted that rotational angle sensor 25 may not be provided when control device 30 directly finds rotational angle $\theta$ from the motor voltage and current.

Control device 30, which corresponds to a driving control device in the embodiment of the present invention, is constituted by an electronic control unit (ECU), and controls operations of motor driving control system 100 by means of software processing implemented by a program stored in advance and/or hardware processing implemented by an electronic circuit.

As a representative function, control device 30 controls operations of step-up/step-down converter 12 and inverter 14 using a below-described control method based on input torque command value Trqcom, direct-current voltage Vb detected by voltage sensor 10, direct-current Ib detected by current sensor 11, system voltage VH detected by voltage sensor 13, motor currents iv, iw detected by current sensors 24, rotational angle $\theta$ detected by the rotational angle sensor, and the like, so as to allow alternating-current motor M1 to output a torque according to torque command value Trqcom. In other words, control device 30 generates switching control signals S1-S8 to control step-up/step-down converter 12 and inverter 14 in the manner described above, and sends them to step-up/step-down converter 12 and inverter 14.

In the step-up operation of step-up/step-down converter 12, control device 30 controls output current VH of smoothing capacitor C0 through feedback to generate switching control signals S1, S2 so that output current VH has a value equal to the voltage command value.

Further, when control device 30 receives from the external ECU a signal RGE indicating that the hybrid vehicle or electric vehicle has entered the regenerative braking mode, control device 30 generates switching control signals S3-S8 to convert the alternating-current voltage generated by alternating-current motor M1 into a direct-current voltage, and outputs them to inverter 14. Accordingly, inverter 14 converts the alternating-current voltage generated by alternating-current motor M1 into the direct-current voltage and supplies it to step-up/step-down converter 12.

Furthermore, when control device 30 receives from the external ECU signal RGE indicating that the hybrid vehicle or electric vehicle has entered the regenerative braking mode, control device 30 generates switching control signals S1, S2 to step down the direct-current voltage supplied from inverter 14, and outputs them to step-up/step-down converter 12. Accordingly, the alternating-current voltage generated by alternating-current motor M1 is converted into a direct-current voltage, which is then stepped down and is supplied to direct-current power source B.

Explanation for Control Modes

The following describes how control device 30 controls alternating-current motor M1, more in detail.

FIG. 2 schematically illustrates control modes for alternating-current motor M1 in the motor driving system in the embodiment of the present invention.

How control device 30 controls alternating-current motor M1 will be described more in detail.

FIG. 2 schematically illustrates the control modes for alternating-current motor M1 in the motor driving control system of the embodiment of the present invention.

As shown in FIG. 2, in motor driving control system 100 according to the embodiment of the present invention, three control modes are utilized and are switched thereamong for control for alternating-current motor M1, i.e., power conversion in inverter 14.

Sinusoidal wave PWM control is utilized as general PWM control, and is to control the upper/lower arm elements of each phase to turn on/off, in accordance with a comparison of voltage between a voltage command of a sinusoidal wave and a carrier (of a triangular wave, representatively). As a result, a duty is controlled so that the fundamental wave component is a sinusoidal wave during a certain period in a set of a high level period and a low level period. The high level period corresponds to an on period of the upper arm element whereas the low level period corresponds to an on period of the lower arm element. As known well, in the sinusoidal wave PWM control, the amplitude of the voltage command is limited to a range not more than the amplitude of the carrier, and therefore the amplitude of the fundamental wave component can be increased greater only by approximately 0.61 times than the direct-current link voltage of the inverter. Hereinafter, in the present specification, a ratio of the amplitude of the fundamental wave component of a voltage applied to alternating-current motor M1 (hereinafter, also simply referred to as "motor applied voltage") to the direct-current link voltage of inverter 14 (i.e., system voltage VH) is referred to as "modulation factor". More specifically, in the present embodiment, the modulation factor is expressed by a ratio of the fundamental wave component (effective value) of a line voltage in alternating current motor M1 to system voltage VH.

On the other hand, in rectangular wave voltage control, during the above-described certain period, the alternating-current motor is fed with one pulse of a rectangular wave in which a ratio of the high level period and the low level period is 1:1. This increases the modulation factor up to 0.78.

Overmodulation PWM control is to perform PWM control similar to that in the sinusoidal wave PWM control, in a range in which the amplitude of the voltage command is larger than the amplitude of the carrier. In particular, the voltage command, which intrinsically represents a sinusoidal wave, is distorted to increase the fundamental wave component. In this way, the modulation factor can be increased up to a range from the maximal modulation factor in the sinusoidal wave PWM control mode to 0.78.

In alternating-current motor M1, increase in the rotation speed or the output torque causes increased induced voltage. Accordingly, required driving voltage (motor required voltage) is high. A step-up voltage provided by converter 12, i.e., system voltage VH needs to be set higher than this motor required voltage, but it also has a limit value (VH maximal voltage).

Hence, in a region in which the motor required voltage is smaller than the VH maximal voltage, a PWM control mode employing the sinusoidal wave PWM control or the overmodulation PWM control is applied to control an output torque to be equal to torque command value Trqcom through feedback control of the motor current according to vector control. On the other hand, when the motor required voltage reaches the VH maximal voltage, system voltage VH is set at the VH maximal voltage and the rectangular wave voltage control mode is applied. In the rectangular wave voltage control, the amplitude of the fundamental wave component is fixed. Hence, the torque is controlled through phase control for the pulse of the rectangular wave voltage, based on a deviation between the torque actual value and the torque command value.

Of these PWM control modes, the control mode in which the overmodulation PWM control is applied is referred to as "overmodulation mode" and the control mode in which the sinusoidal wave PWM control is applied is referred to as "sinusoidal wave modulation mode" in the description below.

FIG. 3 shows a correspondence relation between operating states of alternating-current motor M1 and the above-described control modes.

Referring to FIG. 3, schematically, the sinusoidal wave modulation mode is used in a low rotation speed region A1 to reduce fluctuation of torque, the overmodulation mode is applied in a middle rotation speed region A2, and the rectangular wave voltage control mode is applied in a high rotation speed region A3. In particular, the overmodulation mode and the rectangular wave voltage control mode thus applied allow for improved output of alternating-current motor M1. As such, which one of the control modes shown in FIG. 2 is used is determined within a range of an implementable modulation factor, basically.

Figure 4:
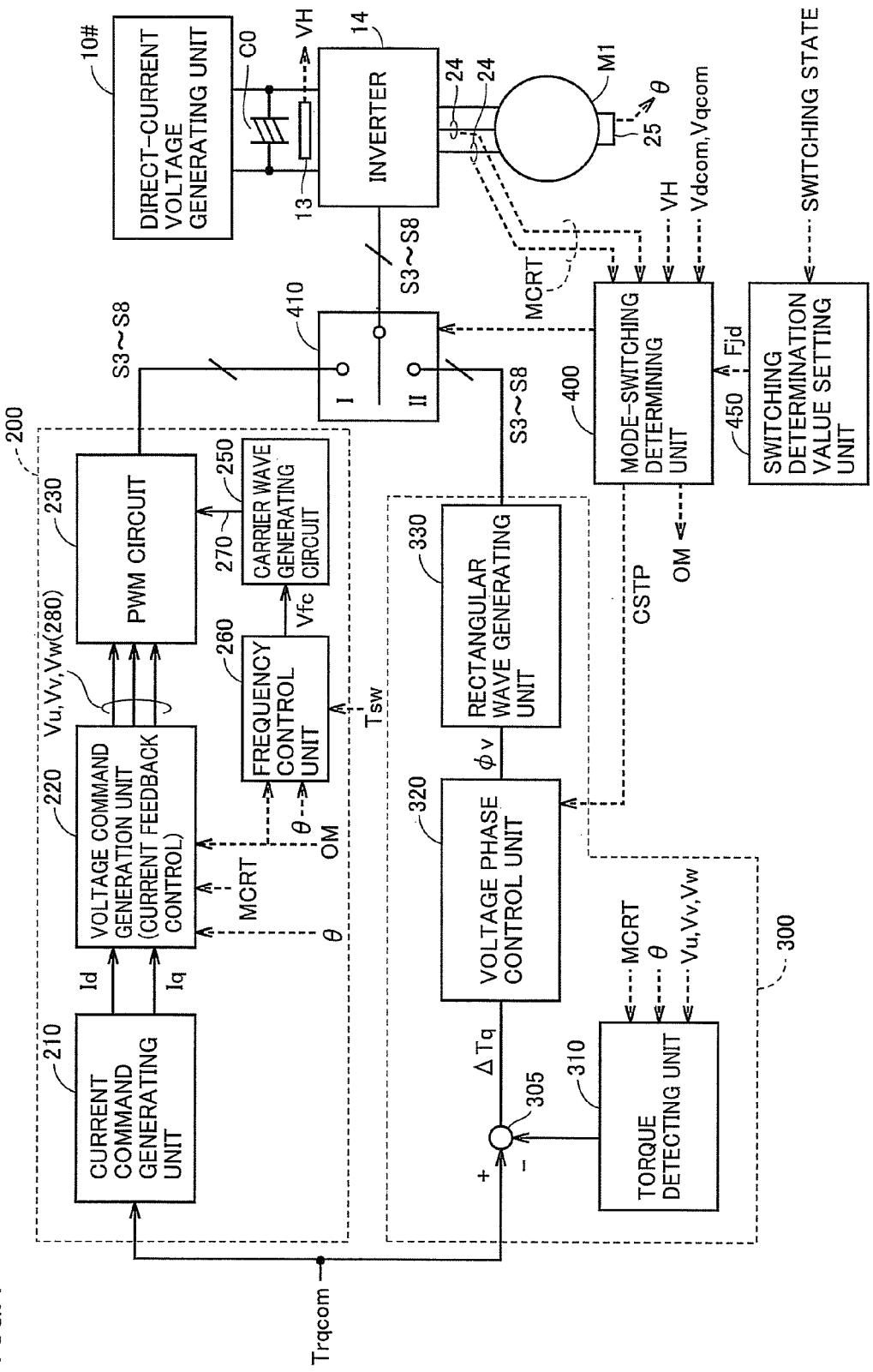
FIG. 4 is a block diagram illustrating a motor control configuration in the control device and the control method for the alternating-current motor according to the embodiment of the present invention.

FIG. 4 is a block diagram illustrating a motor control configuration according to the control device and the control method for the alternating-current motor in accordance with the embodiment of the present invention. Each block shown in FIG. 4 for the motor control is implemented by a hardware or software process performed by control device 30.

Referring to FIG. 4, when the PWM control mode is selected, a PWM control unit 200 generates switching control signals S3-S8 for inverter 14 in accordance with the PWM control so as to allow alternating-current motor M1 to output a torque according to torque command value Trqcom. PWM control unit 200 includes a current command generating unit 210, a voltage command generation unit 220, a PWM circuit 230, a carrier wave generating circuit 250, and a frequency control unit 260.

When the rectangular wave voltage control mode is selected, a rectangular wave voltage control unit 300 generates switching control signals S3-S8 for inverter 14 so as to produce a rectangular wave voltage of a voltage phase allowing alternating-current motor M1 to output a torque according to torque command value Trqcom. Rectangular wave voltage control unit 300 includes a calculation unit 305, a torque detecting unit 310, a voltage phase control unit 320, and a rectangular wave generating unit 330.

Mode-switching determining unit 400 determines whether to switch the modes between the PWM control mode and the rectangular wave voltage control mode shown in FIG. 3. Since the PWM control mode includes the sinusoidal wave modulation mode and the overmodulation mode as described above, mode-switching determining unit 400 has a function of determining whether to switch between the sinusoidal wave modulation mode and the overmodulation mode in the PWM control mode. During the overmodulation mode, a control signal OM is on. Switching determination value setting unit 450 variably sets a switching determination value Fjd based on a power conversion operation state (switching condition) of inverter 14 when the overmodulation mode is selected. Switching determination value Fjd is a value for determining switching from the overmodulation mode to the sinusoidal wave modulation mode.

In accordance with a control mode selected by mode-switching determining unit 400, a switch 410 is set at either of an I side and an II side.

When the PWM control mode is selected, switch 410 is set at the I side and a pseudo sinusoidal wave voltage is applied to alternating-current motor M1 in accordance with switching control signals S3-S8 set by PWM control unit 200. On the other hand, when the rectangular wave voltage control mode is selected, switch 410 is set at the II side and inverter 14 applies a rectangular wave voltage to alternating-current motor M1 in accordance with switching control signals S3-S8 set by rectangular wave voltage control unit 300.

The following describes details of respective functions of the blocks.

In PWM control unit 200, current command generating unit 210 generates current command values for allowing alternating-current motor M1 to produce a torque according to torque command value Trqcom. In the PWM control, the current commands are generally set as current command values Idcom and Iqcom of d-q axes. Based on current command values Idcom, Iqcom, a current amplitude |I| and a current phase φi can be found.

Voltage command generation unit 220 finds a d axis current and a q axis current by converting motor current MCRT (three-phase current), detected by current sensors 24, from three phases into two phases using rotor rotational angle θ. Further, voltage command generation unit 220 generates voltage command values Vdcom, Vqcom based on for example proportional integral (PI) control, for feedback control to compensate current deviation from each of current command values Idcom, Iqcom. Furthermore, by inversely converting voltage command values Vdcom, Vqcom from two phases to three phases, voltage commands Vu, Vv, Vw of respective phases for inverter 14 are generated. Voltage commands Vu, Vv, Vw are sent to PWM circuit 230.

Figure 5:
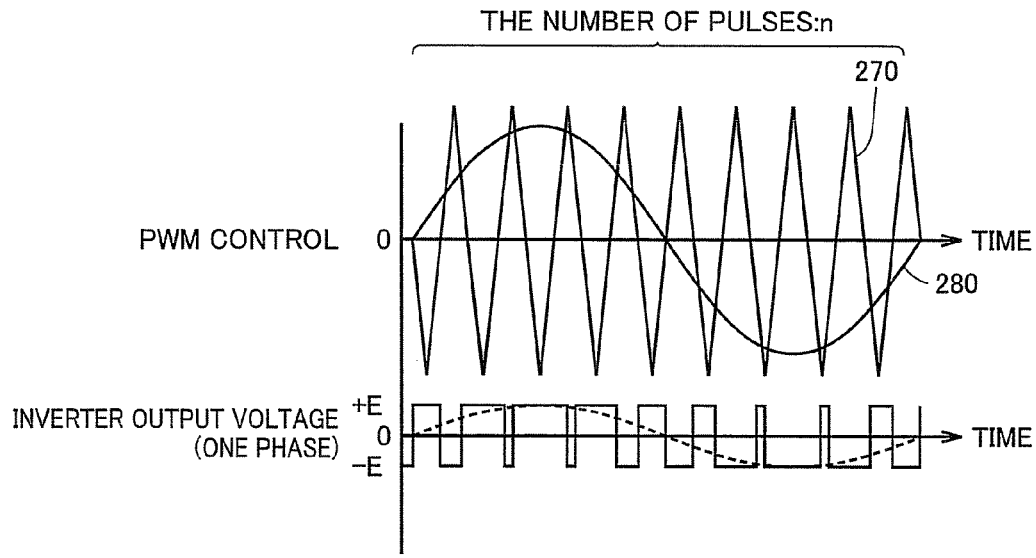
FIG. 5 is a waveform diagram illustrating an operation of a PWM circuit.

As shown in FIG. 5, PWM circuit 230 controls the upper/lower arm elements of the respective phases in inverter 14 to turn on/off, based on a comparison between carrier wave 270 from carrier wave generating circuit 250 and voltage command 280 (which represents Vu, Vv, Vw collectively) from voltage command generation unit 220, thereby generating pseudo sinusoidal wave voltages of the phases in alternating-current motor M1.

It should be noted that during the overmodulation mode in which control signal OM is on, the amplitudes of voltage commands Vu, Vv, Vw are larger than that of carrier wave 270. In particular, the amplitudes of the voltage commands are set to be larger than the amplitudes according to intrinsic voltage command values Vdcom, Vqcom obtained through feedback control. In this way, the intrinsic modulation factor can be secured.

Carrier wave generating circuit 250 controls a frequency of carrier wave 270 in accordance with a control signal Vfc from frequency control unit 260. For example, carrier wave generating circuit 250 includes a voltage-controlled oscillator (VCO).

In the sinusoidal wave modulation mode in which the asynchronous PWM is applied, frequency control unit 260 sets a control signal Vfc for indicating a carrier frequency, irrespective of the rotation speed of alternating-current motor M1 (hereinafter, simply referred to as "motor rotation speed"). The carrier frequency in the sinusoidal wave modulation mode is set to fall within a range in which the carrier frequency is higher than the audio frequency band and switching loss is not excessive (for example, approximately 5-10 kHz). Further, when a switching element temperature Tsw is increased or when alternating-current motor M1 is locked (when torque is generated and the speed is very low), control of decreasing the carrier frequency is performed to reduce switching loss.

Meanwhile, in the overmodulation mode in which synchronous PWM is applied, frequency control unit 260 controls the carrier frequency in accordance with the motor rotation speed. Namely, frequency control unit 260 sets control signal Vfc so that the carrier frequency is an integral multiple (preferably, 3·(2n−1) times, where n is a natural number) of the frequency of each voltage command that follows the motor rotation speed. Then, in synchronism with the phase of the voltage command, carrier wave generating circuit 250 generates carrier wave 270 having a frequency according to control signal Vfc. In this way, in the overmodulation mode, the number of pulses n in one rotation of alternating-current motor M1 (an electrical angle of 360°) is controlled to be a predetermined number (preferably, 3·(2n−1)).

In this way, PWM control unit 200 performs feedback control to match motor current MCRT of alternating-current motor M1 with the current commands set by current command generating unit 210.

Meanwhile, in rectangular wave voltage control unit 300, torque detecting unit 310 detects the output torque of alternating-current motor M1. Torque detecting unit 310 can be constituted by a known torque sensor but may be configured to detect output torque Tq according to a calculation expressed by the following formula (1):

$$Tq = Pm/\omega = (iu \cdot vu + iv \cdot vv + iw \cdot vw)/\omega \qquad (1)$$

In formula (1), Pm indicates power supplied to alternating-current motor M1, ω indicates an angular velocity of alternating-current motor M1, iu, iv, iw indicate phase current values of alternating-current motor M1 respectively, and vu, vv, vw indicate respective phase voltages supplied to alternating-current motor M1. For vu, vv, vw, voltage commands Vu, Vv, Vw set in inverter 14 may be employed or values of actual applied voltages detected using a sensor may be used. Further, output torque Tq is determined by a designed value of alternating-current motor M1 and therefore may be estimated from the amplitudes and phases of the currents.

Calculation unit 305 calculates a torque deviation ΔTq, which is a deviation of output torque Tq, detected by torque detecting unit 310, from torque command value Trqcom. Torque deviation ΔTq thus calculated by calculation unit 305 is supplied to voltage phase control unit 320.

Voltage phase control unit 320 generates a voltage phase φv in accordance with torque deviation ΔTq. Voltage phase φv represents a phase of a rectangular wave voltage to be applied to alternating-current motor M1. Specifically, as parameters for generating voltage phase φv, voltage phase control unit 320 uses torque deviation ΔTq as well as input voltage VH of inverter 14 and angular velocity ω of alternating-current motor M1. Voltage phase control unit 320 substitutes them into a predetermined arithmetic formula or provide an equivalent process thereto, so as to produce voltage phase φv required.

In order to produce a rectangular wave voltage according to voltage phase φv obtained from voltage phase control unit 320, rectangular wave generating unit 330 generates switching control signals S3-S8 for inverter 14. In this way, rectangular wave voltage control unit 300 performs feedback control to adjust the phase of the rectangular wave voltage in accordance with the torque deviation in alternating-current motor M1.

Control Mode Switching Process

The following describes a control mode switching determination process in the motor control configuration of FIG. 4.

As shown in FIG. 4, mode-switching determining unit 400 determines whether to switch the modes, based on motor current MCRT (iv, iw) detected by current sensors 24, input voltage VH of inverter 14 detected by voltage sensor 13, and voltage commands Vdcom, Vqcom generated by voltage command generation unit 220.

Figure 6:
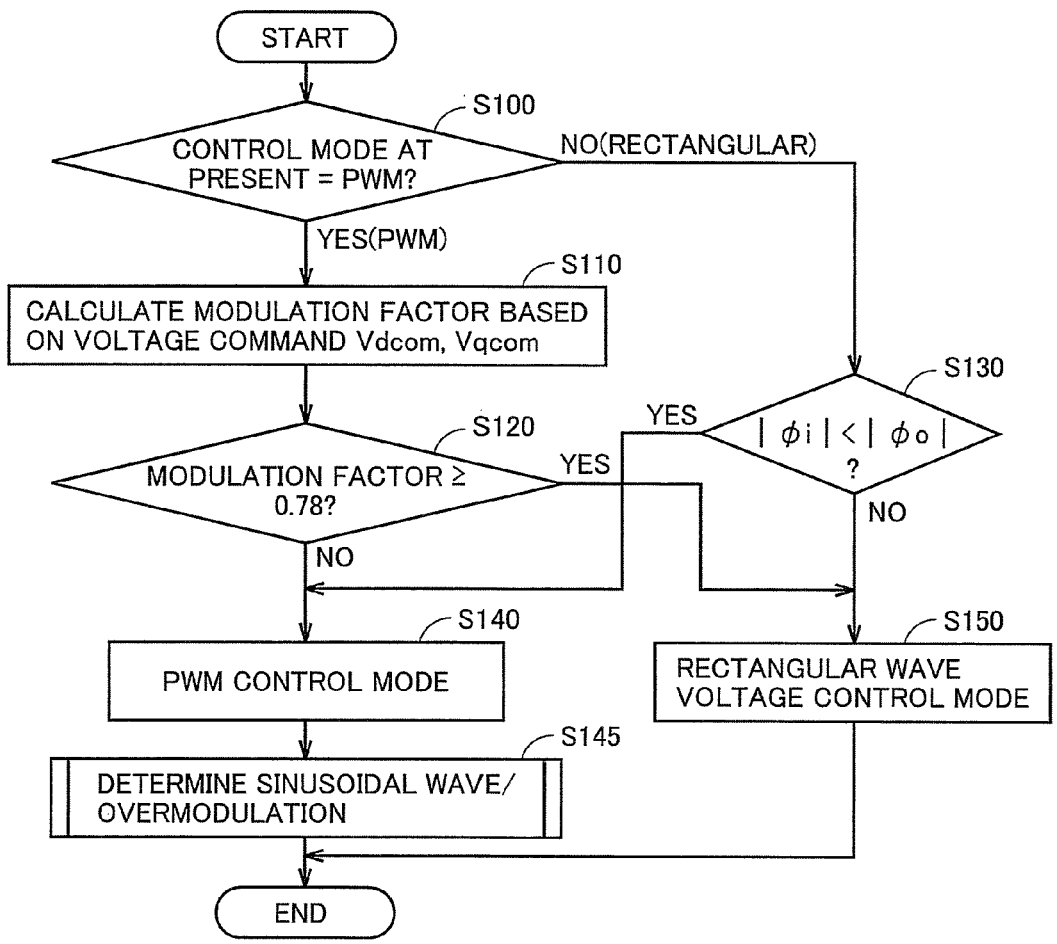
FIG. 6 is a flowchart illustrating a control mode switching determination process in the motor control configuration shown in FIG. 4.

For example, mode-switching determining unit 400 implements the determination of switching the modes, by control device 30 performing a control process according to a flowchart of FIG. 6.

Referring to FIG. 6, in step S100, control device 30 first determines whether or not the control mode at present is the PWM control mode. When the control mode at present is the PWM control mode (when it is determined YES in S100), in step S110, control device 30 calculates a modulation factor for converting input voltage VH of inverter 14 into a motor-applied voltage command (alternating-current voltage) to be applied to alternating-current motor M1, based on voltage command values Vdcom, Vqcom according to the PWM control mode and system voltage VH.

For example, modulation factor MF is calculated by means of the following formula (2):

$$MF = (Vdcom^2 + Vqcom^2)^{1/2}/VH \qquad (2)$$

In step S120, control device 30 determines whether or not the modulation factor calculated in step S110 is equal to or greater than 0.78. When modulation factor $\geq$ 0.78 (when it is determined YES in S120), an appropriate alternating-current voltage cannot be generated with the PWM control mode, so control device 30 proceeds with the process to step S150 so as to switch the control modes to the rectangular wave voltage control mode.

On the other hand, when it is determined NO in step S120, i.e., when the modulation factor calculated in step S110 is smaller than 0.78, control device 30 maintains the PWM control mode in step S140, continuously.

Meanwhile, when the control mode at present is the rectangular wave voltage control mode (when it is determined NO in S100), in step S130, control device 30 monitors whether or not the absolute value of alternating-current phase (actual current phase) φi supplied from inverter 14 to alternating-current motor M1 is smaller than the absolute value of a predetermined switching current phase φ0. It should be noted that switching current phase φ0 may be set at different values when alternating-current motor M1 performs power running and when alternating-current motor M1 performs regeneration.

When the absolute value of actual current phase φi is smaller than the absolute value of switching current phase φ0 (when it is determined YES in S130), control device 30 determines to switch the control modes from the rectangular wave voltage control mode to the PWM control. In this case, in step S140, control device 30 selects the PWM control mode.

On the other hand, when it is determined NO in step S130, i.e., when the absolute value of actual current phase φi is equal to or greater than the absolute value of switching current phase φ0, in step S150, control device 30 maintains the control mode to be the rectangular wave voltage control mode.

When the PWM control mode is selected (S140), in step S145, control device 30 determines which one of the sinusoidal wave modulation mode (sinusoidal wave PWM control) and the overmodulation mode (overmodulation PWM control) is applied. Details of this determination will be described later.

Figure 7:
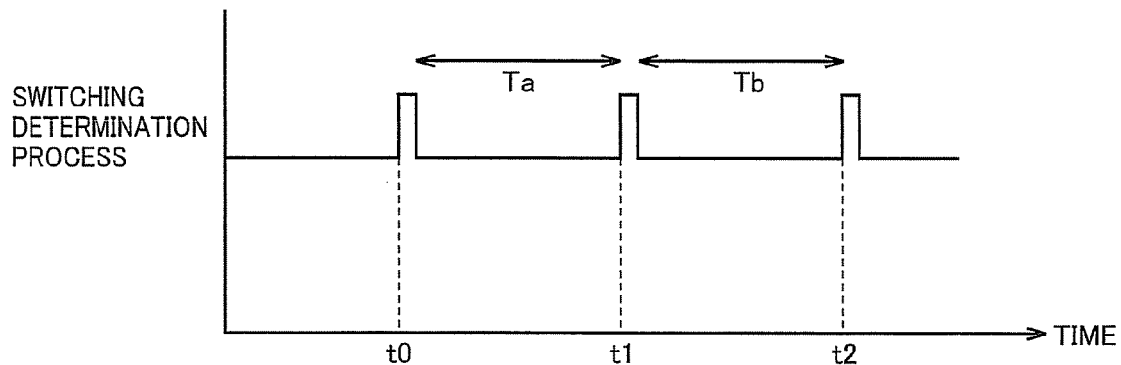
FIG. 7 is a schematic view illustrating timings at which the mode switching determination process is performed.

As shown in FIG. 7, the control mode switching determination process according to the flowchart of FIG. 6 is performed by control device 30 at times t0, t1, t2 . . . for every predetermined cycle in accordance with a program stored in advance. The switching determination process can be performed to correspond to a control processing cycle of the sinusoidal wave modulation mode, the overmodulation mode, or the rectangular wave voltage control mode executed. Alternatively, independently of the control process in each control mode, the switching determination process may be performed as a process of a main routine having the processes integrated therein, at a cycle longer than that in the control process for each control mode.

As described above, switching determination value setting unit 450 shown in FIG. 4 variably sets switching determination value Fjd used for the switching determination process for switching from the overmodulation mode to the sinusoidal wave modulation mode, upon performing each of the switching determination processes. For example, in a switching determination process performed at time t1, switching determination value setting unit 450 sets switching determination value Fjd based on a power conversion state (switching state) that inverter 14 is in during a period Ta from time t0, which is the timing of a previous switching determination process, to t1. Likewise, in a switching determination process performed at time t2, switching determination value Fjd is set based on a power conversion state that it is in during a period Tb of time t1-t2.

Figure 8:
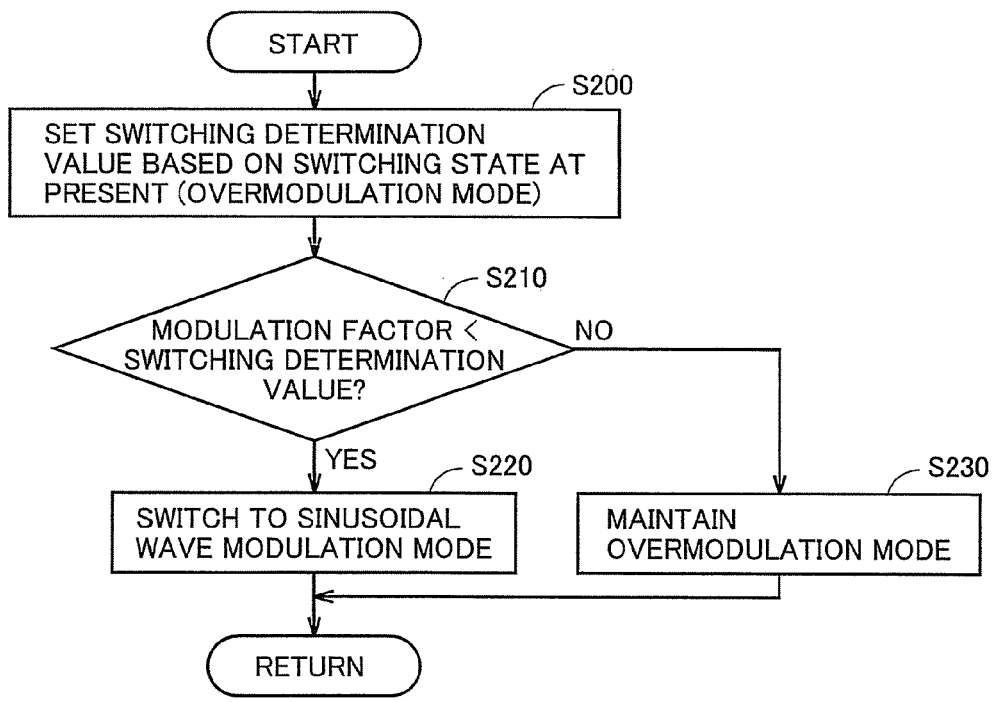
FIG. 8 is a flowchart illustrating details of the switching determination process for switching from an overmodulation mode to a sinusoidal wave modulation mode.

With reference to FIG. 8, the following fully describes the switching determination process for switching from the overmodulation mode to the sinusoidal wave modulation mode in the control device and control method for the alternating-current motor in accordance with the embodiment of the present invention.

FIG. 8 is a flowchart illustrating a process routine for determination for the sinusoidal wave modulation mode/the overmodulation mode in step S145 of FIG. 6, when the overmodulation mode is employed.

Referring to FIG. 8, in step S200, control device 30 sets switching determination value Fjd based on the switching state at present in which the overmodulation mode is employed, i.e., the overmodulation PWM control is performed.

In step S210, control device 30 compares the switching determination value set in step S200 with the modulation factor found by formula (2). When the modulation factor is smaller than the switching determination value (when it is determined YES in S210), control device 30 proceeds with the process to step S220 and instructs switching from the overmodulation mode at present to the sinusoidal wave modulation mode. On the other hand, when the modulation factor is equal to or larger than the switching determination value (when it is determined NO in S210), control device 30 proceeds with the process to step S230 to maintain the overmodulation mode at present.

Here, how to set switching determination value Fjd in step S200 will be described in detail.

Switching determination value Fjd is determined based on the number of times of turning on and off each switching element in inverter 14 (hereinafter, referred to as "inverter switching rate") during a certain period in the overmodulation PWM control (for example, electrical angle of 360° in alternating-current motor M1), so as to reflect influence over the motor applied voltage by the number of times of turning on and off each switching element in inverter 14. For example, the actual value of the inverter switching rate can be detected based on switching control signals S3-S8.

In the sinusoidal wave modulation mode employing the asynchronous PWM, the inverter switching rate is substantially fixed. In the overmodulation mode employing the synchronous PWM, the switching rate is likely to change because the carrier frequency changes. Hence, an amount of change in inverter switching rate upon transition from the overmodulation mode to the sinusoidal wave modulation mode differs depending on states in the overmodulation mode.

In particular, when the inverter switching rate is small in the overmodulation mode, switching to the sinusoidal wave modulation mode may result in increased switching rate to decrease the motor applied voltage even if the voltage command is the same. When this phenomenon takes place, the decrease of motor applied voltage causes increased current deviation (shortage of current) to raise the voltage command value to the region of the modulation factor again where the overmodulation mode is applied. As a result, the control mode, which has been just switched from the overmodulation mode to the sinusoidal wave modulation mode, is switched back to the overmodulation mode again. This may trigger occurrence of hunting.

In view of this, when the inverter switching rate in the overmodulation mode is relatively small, switching determination value Fjd is set to prevent such switching from the overmodulation mode to the sinusoidal wave modulation mode.

Specifically, switching determination value Fjd can be set in step S200 in accordance with the following formula (3) with reference to a map (not shown) prepared in advance and indicating a correction value $\Delta F$ for the inverter switching rate in the overmodulation mode:

$$Fjd = Fstd - \Delta F \quad (3)$$

In formula (3), Fstd can be set at 0.61, which is a theoretical value of the fundamental wave component in the PWM control when the voltage command and the carrier are equal in amplitude. Further, $\Delta F$ is set to increase as the inverter switching rate is smaller.

Alternatively, the following formula (4) may be used to set correction value $\Delta F$ more precisely:

$$\Delta F = K \cdot (SNsn - SNom) \quad (4)$$

In formula (4), SNom indicates an actual value of the inverter switching rate in the overmodulation mode. SNsn indicates an estimated value of the inverter switching rate when the sinusoidal wave modulation mode is applied. SNsn can be estimated based on the carrier frequency and the motor rotation speed. The carrier frequency is set by frequency control unit 260 when applying the sinusoidal wave modulation mode in the state at present. It should be noted that K indicates an adjustment coefficient appropriately set depending on characteristics of inverter 14.

Alternatively, in order to reflect the switching state in inverter 14 more simply, correction value $\Delta F$ for the switching determination value may be calculated based on the carrier frequency instead of the inverter switching rate. In this case, correction value $\Delta F$ can be calculated with reference to a map that is configured to increase $\Delta F$ as the carrier frequency is smaller in the overmodulation mode.

Alternatively, instead of formula (4) above, the following formula (5) may be used to find correction value $\Delta F$:

$$\Delta F = K \cdot (CFsn - CFom) \quad (5)$$

In formula (5), CFom indicates the carrier frequency at present in the overmodulation mode, and CFsn indicates an estimated value of the carrier frequency applied by frequency control unit 260 when the control mode is switched to the sinusoidal wave modulation mode.

As described above, in motor driving control system 100 of the present embodiment, the switching determination value can be set variably based on a switching state (power conversion operation state) of inverter 14 in the overmodulation mode, so as to reflect influences of the change in motor applied voltage caused by the change in inverter switching rate upon switching from the overmodulation mode to the sinusoidal wave modulation mode.

As a result, the switching determination value can be variably set to prevent the transition from the overmodulation mode to the sinusoidal wave modulation mode when the increase of switching rate is noticeable due to switching to the sinusoidal wave modulation mode and a voltage command requiring immediate switching to the overmodulation mode is likely to be generated due to the influence of the change in dead time. Accordingly, switching from the overmodulation mode to the sinusoidal wave modulation mode can be determined appropriately, thus preventing occurrence of hunting upon switching between the control modes. In this way, the control can be stable.

First Variation

As described above, when the inverter switching rate is changed, the motor applied voltage is changed due to the influence of the dead time. Here, whether the motor applied voltage is changed to increase the amplitude thereof or is changed to decrease the amplitude thereof is associated with the phases of the motor applied voltage and the motor current.

Figure 9A:
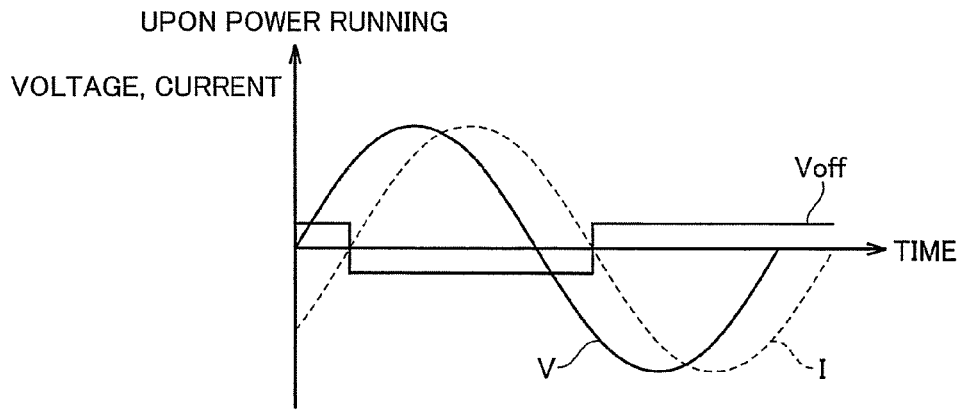
FIG. 9A is a schematic view showing typical voltage and current waveforms during power running in the alternating-current motor.

FIG. 9A shows typical voltage/current waveforms during power running of alternating-current motor M1. As shown in FIG. 9A, during the operation of power running, the phase of current I is delayed relative to the phase of voltage V. Fluctuation of the motor applied voltage (offset Voff) resulting from the change in dead time caused by the increased inverter switching rate is changed according to a polarity of the current. Namely, during a period in which current I is positive, Voff is negative. In contrast, when current I is negative, Voff is positive. Hence, during the power running, offset Voff resulting from increased inverter switching rate acts to decrease the amplitude of the motor applied voltage.

Figure 9B:
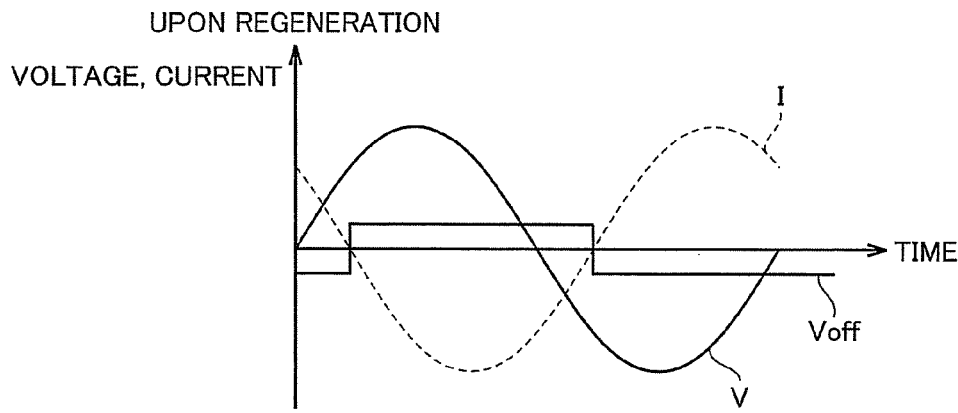
FIG. 9B is a schematic view showing typical voltage and current waveforms during regeneration in the alternating-current motor.

Meanwhile, FIG. 9B shows typical voltage/current waveforms during regeneration of alternating-current motor M1. As shown in FIG. 9B, during the regeneration, a phase difference between voltage V and current I is large to such an extent that they have substantially opposite phases. Accordingly, during the regeneration, offset Voff acts to increase the amplitude of the motor applied voltage.

It is appreciated that the characteristics of the change in voltage command is thus changed in accordance with the phase difference between voltage V and current I in alternating-current motor M1, i.e., the power factor, with the result that the characteristics of the change in motor applied voltage upon switching the control modes differ. In view of this, in the first variation, in step S200 of variably setting switching determination value Fjd as shown in FIG. 8, correction value $\Delta F$ is determined according to the power factor upon the overmodulation PWM control.

Namely, when the power factor is large (i.e., when the phase difference between the voltage and the current is small), the influence of the dead time acts to decrease the amplitude of the motor applied voltage as shown in FIG. 9A. Hence, just after switching from the overmodulation mode to the sinusoidal wave modulation mode, it is highly likely to be determined to switch back to the overmodulation mode again. In order to prevent such switching from the overmodulation mode to the sinusoidal wave modulation mode, the switching determination value is preferably set at a low value by setting correction value ΔF at a relatively large value.

In contrast, in the case of FIG. 9B, the above-described phenomenon is less likely to take place. Hence, it is expected that no problem occurs when the determination of switching is performed using the modulation factor=0.61, which is a reference value. Accordingly, a map (not shown) can be formed to set correction value ΔF in accordance with the voltage/current phase, i.e., the power factor, in the PWM control performed at present according to the overmodulation mode. Alternatively, correction value ΔF can be determined based on a difference between the actual value of the power factor in the overmodulation mode and the estimated value thereof upon switching to the sinusoidal wave modulation mode, as shown in the following formula (6):

$$\Delta F = K \cdot (PFsn = PFom) \quad (6)$$

In formula (6), PFom indicates the power factor in the PWM control performed at present according to the overmodulation mode. PFom can be found from detection values of the voltage and the current while PFom also can be found from voltage command values Vdcom, Vqcom and current command values Idcom, Iqcom of the d axis and q axis, each of which is used in the PWM control. For example, the power factor (cos φ) can be found from a phase difference φ between a voltage phase $\tan^{-1}$ (Vqcom/Vdcom) that follows the voltage command values and a current phase $\tan^{-1}$ (Iqcom/Idcom) that follows the current commands (i.e., the phase difference between the voltage and the current).

Also in formula (6), PFsn indicates the estimated value of the power factor in the case of switching to the sinusoidal wave modulation mode. This power factor can be estimated based on, for example, a state of the motor (torque or rotation speed) at the moment or the immediately previous voltage/current command.

According to the first variation described above, switching determination value Fjd for switching from the overmodulation mode to the sinusoidal wave modulation mode can be appropriately set to reflect such a fact that the influence of the dead time over the amplitude of the motor applied voltage is changed in accordance with the phase difference between the voltage and the current both supplied from inverter 14 to alternating-current motor M1.

It should be noted that as described in the present embodiment and the first variation thereof, switching determination value Fjd for switching from the overmodulation mode to the sinusoidal wave modulation mode is set to reflect (i) the switching rate, (ii) the carrier frequency, or (iii) the power factor (phase difference between the voltage and the current), as the switching state (power conversion operation state) in inverter 14. Further, in accordance with each of (i)-(iii), correction value ΔF may be determined. Also, by combining at least a part of them, correction value ΔF may be determined in formula (3). For the combination, a minimal value thereof, a maximal value thereof, an average value thereof, or the like may be adopted appropriately. By combining the plurality of factors as such, the switching state (power conversion operation state) in inverter 14 can be reflected more appropriately for the determination of switching from the overmodulation mode to the sinusoidal wave modulation mode.

Second Variation

Hunting presents a problem in the event that it is determined to switch back to the overmodulation mode just after switching from the overmodulation mode to the sinusoidal wave modulation mode. In order to avoid such an event, it is required to appropriately prevent such switching from the overmodulation mode to the sinusoidal wave modulation mode.

Figure 10:
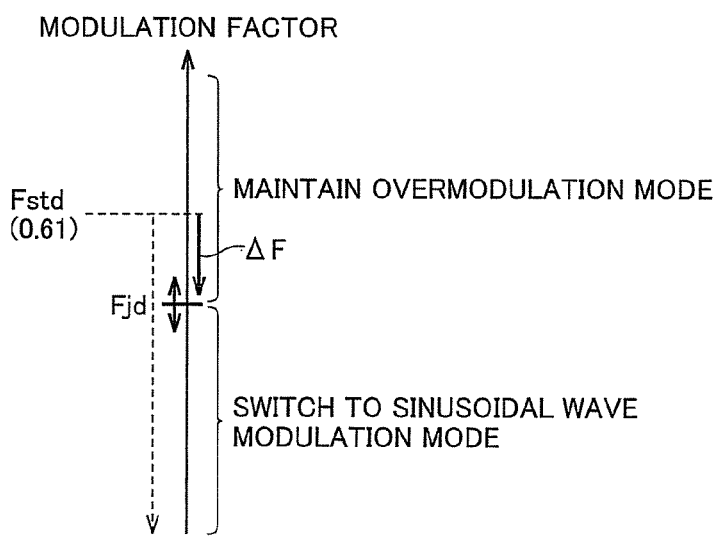
FIG. 10 is a schematic view illustrating limit in setting a correction value for a determination switching value.

As shown in FIG. 10, switching determination value Fjd is set by correcting a predetermined reference value Fstd (0.61, representatively) with correction value ΔF set in accordance with a switching state (power conversion operation state) in inverter 14. When the modulation factor is decreased to go below switching determination value Fjd, switching is performed from the overmodulation mode to the sinusoidal wave modulation mode, whereas when the modulation factor is equal to or larger than the switching determination value Fjd, the overmodulation mode is maintained.

Accordingly, correction value ΔF is set by formulae (4)-(6) or reference to the map so as to limit it to ΔF≧0, thereby variably setting switching determination value Fjd in such a manner that switching determination value Fjd is corrected to be smaller than reference value Fstd, i.e., the switching from the overmodulation mode to the sinusoidal wave modulation mode is prevented.

In this way, in the event that it is considered that hunting is likely to occur, the switching from the overmodulation mode to the sinusoidal wave modulation mode is prevented, whereas in the other event, the control mode can be determined in accordance with the theoretical value (reference value Fstd). Accordingly, stability in control can be further improved.

It should be noted that the present embodiment and the first and second variations thereof deal with the exemplary case where the determination of switching the control modes is performed by comparing the modulation factor with the determination value, but the present invention is applicable to other cases and is not limited to this case. Specifically, a similar effect can be obtained by variably setting the following determination value in accordance with a state in the overmodulation mode as described above, in a control configuration for performing determination of switching the control modes. The determination value thus set is a determination value for which a parameter associated with the voltage command and other than the modulation factor is defined, or a directly set determination value for the amplitude, phase, etc., of the applied voltage.

In the present embodiment, the determination of switching from the sinusoidal wave modulation mode to the overmodulation mode is not illustrated in the figures. The determination of switching may be such that in order to prevent hunting, switching to the overmodulation mode is performed only when a determination value, set to provide a hysterisis to switching determination value Fjd employed for the immediately previous switching to the sinusoidal wave modulation mode, is sequentially compared with the modulation factor that is based on the voltage command and the modulation factor is higher than the determination value.

It should be considered that the embodiments disclosed herein are illustrative and non-restrictive in any respect. The scope of the present invention is defined by the scope of claims, and is intended to include any modifications within the scope and meaning equivalent to the terms of the claims.

INDUSTRIAL APPLICABILITY

The present invention can be used for control for an alternating-current motor. In the control, pulse width modulation (PWM) control having a sinusoidal wave modulation mode and an overmodulation mode is applied.

DESCRIPTION OF THE REFERENCE SIGNS

5: earth line; 6, 7: power line; 10, 13: voltage sensor; 10#: direct-current voltage generating unit; 11, 24: current sensor;

12: step-up/step-down converter; 14: inverter; 15: U-phase upper/lower arms; 16: V-phase upper/lower arms; 17: W-phase upper/lower arms; 25: rotational angle sensor; 30: control device (ECU); 100: motor driving control system; 200: PWM control unit; 210: current command generating unit; 220: voltage command generation unit; 230: PWM circuit; 250: carrier wave generating circuit; 260: frequency control unit; 270: carrier wave; 280: voltage command; 300: rectangular wave voltage control unit; 305: calculation unit; 310: torque detecting unit; 320: voltage phase control unit; 330: rectangular wave generating unit; 400: mode-switching determining unit; 410: switch; 450: switching determination value setting unit; B: direct-current power source; C0, C1: smoothing capacitor; D1-D8: anti-parallel diode; Fjd: switching determination value; Idcom, Iqcom: current command value; iu, iv, iw, MCRT: motor current; L1: reactor; M1: alternating-current motor; MCRT: motor current; OM: control signal (overmodulation mode); Q1-Q8: power semiconductor switching element; S1-S8: switching control signal; SR1, SR2: system relay; Trqcom: torque command value; Tsw: switching element temperature; Vdcom, Vqcom: voltage command value (d-q axes); Vfc: control signal (carrier frequency); VH: system voltage (inverter DC link voltage); Voff: offset; Vu, Vv, Vw: voltage command of each phase; ΔF: correction value (switching determination value); θ: rotor rotational angle; ω: angular velocity.

The invention claimed is:

1. A control device for an alternating-current motor, in which an applied voltage is controlled by an inverter, the control device comprising:
    a pulse width modulation control unit for generating a control command for said inverter by performing pulse width modulation control based on a comparison between a voltage command signal of sinusoidal wave for operating said alternating-current motor in accordance with an operation command and a carrier wave signal,
    a mode-switching determining unit for indicating which one of an overmodulation mode and a sinusoidal wave modulation mode is used for said pulse width modulation control performed by said pulse width modulation control unit, in said overmodulation mode, a frequency of said carrier wave signal being controlled in accordance with rotation speed of said alternating-current motor such that the frequency of said carrier wave signal is an integral multiple of a rotational frequency of said alternating-current motor, in said sinusoidal wave modulation mode, the frequency of said carrier wave signal being set irrespective of the rotation speed of said alternating-current motor; and
    a determination value setting unit for variably setting a switching determination value for determining switching from said overmodulation mode to said sinusoidal wave modulation mode, based on a state of a power conversion operation performed by said inverter, when said pulse width modulation control is performed in accordance with said overmodulation mode,
    said mode-switching determining unit determining whether to switch from said overmodulation mode to said sinusoidal wave modulation mode, based on a comparison between a value concerned with said voltage command signal and said switching determination value.

2. The control device for an alternating-current motor according to claim 1, wherein:
    said inverter includes a power semiconductor switching element turned on/off according to said control command from said pulse width modulation control unit,
    said determination value setting unit variably sets said switching determination value in accordance with the number of times of on/off of said power semiconductor switching element during a certain period in said overmodulation mode.

3. The control device for an alternating-current motor according to claim 2, wherein:
    said determination value setting unit variably sets said switching determination value based on a difference between a present value of the number of times of on/off of said power semiconductor switching element in said certain period in said overmodulation mode and an estimated value thereof upon transition to said sinusoidal wave modulation mode.

4. The control device for an alternating-current motor according to claim 1, wherein:
    said determination value setting unit variably sets said switching determination value in accordance with the frequency of said carrier wave signal in said overmodulation mode.

5. The control device for an alternating-current motor according to claim 4, wherein:
    said determination value setting unit variably sets said switching determination value based on a difference between a present value of the frequency of said carrier wave signal in said overmodulation mode and an estimated value thereof upon transition to said sinusoidal wave modulation mode.

6. The control device for an alternating-current motor according to claim 1, wherein said determination value setting unit variably sets said switching determination value in accordance with an power factor for an alternating-current power in said overmodulation mode, said alternating-current power being transmitted between said inverter and said alternating-current motor in accordance with said control command from said pulse width modulation control unit.

7. The control device for an alternating-current motor according to claim 6, wherein said determination value setting unit variably sets said switching determination value based on a difference between a present value of the power factor for said alternating-current power in said overmodulation mode and an estimated value thereof upon transition to said sinusoidal wave modulation mode.

8. The control device for an alternating-current motor according to claim 1, wherein:
    said determination value setting unit sets said switching determination value by correcting a predetermined reference value with a correction value, which is variably set based on the state of said power conversion operation, and
    said correction value is set only for a polarity preventing transition from said overmodulation mode to said sinusoidal wave modulation mode.

9. The control device for an alternating-current motor according to claim 1, wherein the value concerned with said voltage command signal and said switching determination value are indicated by a modulation ratio determined by a direct-current voltage input to said inverter and a voltage command value based on which said voltage command signal is generated.

10. The control device for an alternating-current motor according to claim 9, wherein the input direct-current voltage is generated by a converter for variably controlling an output voltage of a direct-current power source.

11. A control method for an alternating-current motor, in which an applied voltage is controlled by an inverter, the control method comprising the steps of:

controlling said inverter by performing pulse width modulation control based on a comparison between a voltage command signal of sinusoidal wave for operating said alternating-current motor in accordance with an operation command and a carrier wave signal; and selecting which one of an overmodulation mode and a sinusoidal wave modulation mode is applied to said pulse width modulation control, in said overmodulation mode, a frequency of said carrier wave signal being controlled in accordance with rotation speed of said alternating-current motor such that the frequency of said carrier wave signal is an integral multiple of a rotational frequency of said alternating-current motor, in said sinusoidal wave modulation mode, the frequency of said carrier wave signal being set irrespective of the rotation speed of said alternating-current motor, the step of selecting including the steps of:

variably setting a switching determination value for determining switching from said overmodulation mode to said sinusoidal wave modulation mode, based on a state of a power conversion operation performed by said inverter, when said pulse width modulation control is performed in accordance with said overmodulation mode, and determining whether to switch from said overmodulation mode to said sinusoidal wave modulation mode, based on a comparison between said switching determination value and a value concerned with said voltage command signal.

12. The control method for an alternating-current motor according to claim 11, wherein:

said inverter includes a power semiconductor switching element turned on/off according to a control command that follows said pulse width modulation control, and the step of setting variably sets said switching determination value in accordance with the number of times of on/off of said power semiconductor switching element in a certain period in said overmodulation mode.

13. The control method for an alternating-current motor according to claim 12, wherein:

the step of setting variably sets said switching determination value based on a difference between a present value of the number of times of on/off of said power semiconductor switching element in said certain period in said overmodulation mode and an estimated value thereof upon transition to said sinusoidal wave modulation mode.

14. The control method for an alternating-current motor according to claim 11, wherein:

the step of setting variably sets said switching determination value in accordance with the frequency of said carrier wave signal in said overmodulation mode.

15. The control method for an alternating-current motor according to claim 14, wherein:

the step of setting variably sets said switching determination value based on a difference between a present value of the frequency of said carrier wave signal in said overmodulation mode and an estimated value thereof upon transition to said sinusoidal wave modulation mode.

16. The control method for an alternating-current motor according to claim 11, wherein the step of setting variably sets said switching determination value in accordance with a power factor for an alternating-current power in said overmodulation mode, said alternating-current power being transmitted between said inverter and said alternating-current motor in accordance with a control command that follows said pulse width modulation control.

17. The control method for an alternating-current motor according to claim 16, wherein the step of setting variably sets said switching determination value based on a difference between a present value of the power factor for said alternating-current power in said overmodulation mode and an estimated value thereof upon transition to said sinusoidal wave modulation mode.

18. The control method for an alternating-current motor according to claim 11, wherein:

the step of setting sets said switching determination value by correcting a predetermined reference value with a correction value, which is variably set based on the state of said power conversion operation, and said correction value is set only for a polarity preventing transition from said overmodulation mode to said sinusoidal wave modulation mode.

19. The control method for an alternating-current motor according to claim 11, wherein the value concerned with said voltage command signal and said switching determination value are indicated by a modulation ratio determined by a direct-current voltage input to said inverter and a voltage signal is generated.

20. The control method for an alternating-current motor according to claim 19, wherein the input direct-current voltage is generated by a converter for variably controlling an output voltage of a direct-current power source.

* * * * *